(12) United States Patent
Meillan

(10) Patent No.: US 9,468,283 B2
(45) Date of Patent: Oct. 18, 2016

(54) HAMMOCK SUSPENSION DEVICE

(71) Applicant: Jean-Christophe Meillan, Ingelheim (DE)

(72) Inventor: Jean-Christophe Meillan, Ingelheim (DE)

(73) Assignee: LA SIESTA GMBH, Jugenheim (DE)

( * ) Notice: Subject to any disclaimer, the term of this patent is extended or adjusted under 35 U.S.C. 154(b) by 142 days.

(21) Appl. No.: 14/504,029

(22) Filed: Oct. 1, 2014

(65) Prior Publication Data

US 2015/0089776 A1    Apr. 2, 2015

(30) Foreign Application Priority Data

Oct. 1, 2013 (DE) .................... 20 2013 104 462 U

(51) Int. Cl.

| | |
|---|---|
| A44B 11/00 | (2006.01) |
| A44B 11/04 | (2006.01) |
| A45F 3/24 | (2006.01) |
| F16G 11/14 | (2006.01) |
| A45F 3/22 | (2006.01) |
| F16G 11/04 | (2006.01) |
| F16G 11/10 | (2006.01) |
| A45F 3/26 | (2006.01) |

(52) U.S. Cl.
CPC ............. *A45F 3/24* (2013.01); *A44B 11/005* (2013.01); *A44B 11/04* (2013.01); *A45F 3/22* (2013.01); *F16G 11/046* (2013.01); *F16G 11/103* (2013.01); *F16G 11/14* (2013.01); *A45F 3/26* (2013.01); *Y10T 24/3401* (2015.01); *Y10T 24/3416* (2015.01); *Y10T 24/3927* (2015.01); *Y10T 24/3987* (2015.01)

(58) Field of Classification Search
CPC .... F16G 11/046; F16G 11/103; F16G 11/14; F16G 11/143; Y10T 24/3987; Y10T 24/3916; Y10T 24/3918; Y10T 24/3927; Y10T 24/3416; A45F 3/20; A45F 3/24; A45F 3/26
See application file for complete search history.

(56) References Cited

U.S. PATENT DOCUMENTS

| | | | | |
|---|---|---|---|---|
| 364,190 A | * | 5/1887 | Stulz | F16G 11/14 24/129 B |
| 508,698 A | * | 11/1893 | Grant | F16G 11/14 24/129 B |
| 1,366,212 A | * | 1/1921 | Pollard | F16G 11/00 24/129 B |
| 1,421,026 A | * | 6/1922 | Regan | F16G 11/14 114/199 |
| 1,524,108 A | * | 1/1925 | Rowland | B60D 1/187 24/129 R |
| 1,565,041 A | * | 12/1925 | Arney | F16G 11/14 24/129 R |
| 2,151,664 A | * | 3/1939 | Redfield | D06F 53/00 24/129 R |
| 2,193,236 A | * | 3/1940 | Meighan | F16G 11/14 24/129 R |
| 2,825,953 A | * | 3/1958 | Van Driel | D06F 55/00 24/130 |
| 4,178,661 A | * | 12/1979 | Klein | F16G 11/00 24/130 |
| 5,366,327 A | * | 11/1994 | Nelson | B60P 7/0823 24/129 A |

\* cited by examiner

*Primary Examiner* — Robert J Sandy
(74) *Attorney, Agent, or Firm* — Hauptman Ham, LLP

(57) ABSTRACT

A hammock suspension device for guiding a guy rope includes a base body. The base body includes upper and lower apertures, a receptacle for inserting a retaining loop formed by the guy rope, and a guide duct for introducing the guy rope into the hammock suspension device. The upper and lower apertures are arranged in a longitudinal direction of the hammock suspension device. The upper aperture is configured to be oriented toward a fastening point of the guy rope and to connect the guide duct to enable a deflection of the guy rope in the guide duct, from approximately the longitudinal direction of the hammock suspension device to approximately a transverse direction of the hammock suspension device.

10 Claims, 3 Drawing Sheets

HAMMOCK SUSPENSION DEVICE

The invention relates to a hammock suspension device according to the preamble of claim 1.

In the case of suspending hammocks and suspended seats, it is imperatively necessary to perform a height adjustment of the hammock or the suspended seat depending on the weight and the size of the person sitting or lying therein. This is typically achieved by an adjustment of the length of the suspension rope or the suspension chain used. This length is typically adjusted to the height which is comfortable for the user by way of experience values or simple trial and error. Now, the hammock or the suspended seat is fastened on these fastening ropes using the disposed fastening loop or loops, for which often spring hooks or similar releasable connections are used in the prior art.

Specifically when hammocks and suspension ropes are used by various persons, such as arises when used within a family for example, this length readjustment of the guy rope has to be carried out regularly and often, which is why this length adjustment presents a permanently recurring problem.

The use of a spring hook for connecting the fastening rope with the retaining loop of the hammock or the suspended seat, respectively, is also disadvantageous to the extent that this requires a certain expenditure of force, but on the other hand may also cause wear and tear on the loop of the hammock or the suspended seat.

In the prior art, a hammock suspension device which is composed of a body through which, on the one hand, the guy rope is guided through a plurality of apertures, wherein a retaining loop is formed from the guy rope, which retaining loop in turn can be inserted into a receptacle on the hammock device, once this loop has been guided through the fastening loop on the hammock or the suspended seat, is therefore disclosed in DE 20 2011 105 048.8. To this extent, this body serves for forming, from a guy rope, the loop which directly engages on the hammock and thus replaces the hitherto usual spring hook, on the one hand, but also for enabling a specific rope guide pattern which enables flexible length readjustment, on the other hand.

However, it has proven disadvantageous in this context that the special rope guide pattern on this hammock suspension device requires certain practice and thus cannot always be satisfactorily operated by the user. A further disadvantage is that the rope guide pattern on this hammock suspension device has to be loosened at a number of spots for modifying the length of the suspension rope, and the rope has to be guided through these apertures in order to achieve the desired re-adjustability.

Furthermore, a multiplicity of technical devices which serve for tensioning cables and ropes and/or for the releasable connection of the same are known in the prior art. Here, reliance is often placed on mechanical, for example spring-loaded, fixing elements, such as, for example, in the publication U.S. Pat. No. 5,950,556 in which a retaining pin has to pushed inward so as to oppose a spring force, in order to move a rope through this device. When this fastening means is let go of again, the rope becomes fixed in the device.

Other often used devices are used for tensioning a rope, such as is used, for example, for tensioning a tent. To this end, the publication U.S. Pat. No. 4,222,157, in which a device for tensioning a rope is disclosed, is mentioned in an exemplary manner. Said rope is inserted at one end on a portion of the tent and at the other end into a soil anchor. The end of the rope which is inserted in a loop-like manner into the soil anchor is now tensioned by the device in that the device is displaced on the rope by way of a corresponding aperture.

Once the device is now released again in the tensioned state, the device is canted on the rope and thus fixes the desired rope tension. This application is functional for tensioning ropes in the camping sector, as long as said ropes are not exposed to large loads.

However, a weight load of a hammock or a suspended seat which are designed to take 150 kilograms or more cannot be accommodated by such a device. The shortened length of the rope would indeed be adjustable, but only when allowing for evidence of heavy wear and tear on account of the canting process on the rope. Moreover, on account of this arrangement, the connection with the free loop of the hammock or the suspended seat, respectively, would not be possible without using an additional connection means.

It is thus the object of the present invention to achieve a hammock suspension device which provides a flexible and easily readjustable connection between the free end of a guy rope and the retaining loop of a hammock or a suspended seat. Simultaneously, this should be an easily operable device which is gentle on the guy rope and which is able to also accommodate large tensile forces.

This is achieved by a hammock suspension device having the features of claim 1.

Advantageous embodiments of this hammock retaining device are the subject matter of the further claims.

In contrast to the prior art of DE 20 2011 105 042, the hammock suspension device which has now been developed displays a significantly simplified rope guide pattern, on account of which the user is able to execute the readjustment of the rope length for setting the correct height of the hammock or the suspended seat without comparatively great effort. To this end, a body through which the guy rope is guided by way of only two apertures which are disposed on top of one another in the longitudinal extent of the device has been developed.

In contrast to the solution of the prior art, also is no loop directly formed by this rope and the rope then guided back again through the apertures, but only a conventionally knotted loop is attached on the free end of the rope which previously has been guided through these two apertures in the hammock suspension device.

These apertures for accommodating the rope, which are now disposed so as to be linear in relation to one another, are incorporated in the device body in different ways. The upper of the two apertures, which is oriented toward the fastening point of the rope, for example on a wall or on a tree, is disposed so as to be on one side in a vertically running guide duct. From the longitudinal axis of the suspension device, this guide duct runs diagonally to the opposite exit opening but is furthermore widened up to the horizontally running extension of this boring.

On account thereof, a guide duct which, in its base area is approximately triangular and in which the guy rope, from a position which runs approximately vertically parallel to the longitudinal axis of the suspension device, can be pivoted into a position which is offset by approximately 90 degrees is formed. This guide duct is a central development of the suspension device, since the former enables the application of the suspension device and the displacement of the suspension device on the suspension rope, even under a weight load on the rope, in that the ergonomically shaped, easily manageable suspension device is laterally pivoted.

If and when the hammock is fully loaded, the suspension device orients itself in approximately the longitudinal extent of the tensioned guy rope. Here, the rope end which exits on the upper side from the suspension device bears on the vertical portion of the guide duct which runs slightly diagonally. The slightly diagonal arrangement of this guide duct here causes the rope to be guided in a gentle manner through the suspension device, on account of which evidence of wear and tear is counteracted.

If the length modification is now to take place by a displacement of the suspension device on the guy rope, the guy rope is manually turned into a position which is transverse to the profile of the tensioned rope, on account of which the guy rope can easily slide through the upper aperture which points upward. The second aperture which is disposed below the guide duct only runs transversely to the longitudinal extent of the suspension device. Here, deflecting the guy rope from being transversely guided in this manner into the longitudinal extent of the tensioned rope in particular leads to the guy rope being arrested and jammed in the device in the case of a corresponding weight load.

There are various possibilities here as to how the free rope end which exits on the lower side from the suspension device can be guided through the retaining loops of the hammock or the suspended seat and be fastened again on the suspension device. First, the free end of the guy rope is formed by way of a knot into a loop which, for the releasable fastening, is now first guided back again through the retaining loop of the hammock and then to the receptacle. Here, on the one hand, there is the possibility for disposing a hook-like receptacle for inserting the loop on the lower end of the suspension device. An alternative construction concept provides for the loop end to be guided over the suspension device, so as to form the releasable fastening while bearing thereon.

This alternative construction concept expediently provides retaining means for this suspension over the suspension device, for example retaining noses and also guide grooves into which the loop end is placed so as not to slide from the suspension device.

In the case of an arrangement of a hook on the lower side of the suspension device, there are likewise various constructive possibilities. On the one hand, it is provided as a constructive solution to design a hook so as to be offset by 90° in relation to the aperture ducts in the suspension device. An alternative construction concept thereto provides that this hook arrangement is oriented such that it runs parallel to the aperture borings in the suspension device. It is to be achieved in this manner that no friction is created between the loop placed therein and the portion of the guy rope which runs downward and is oriented toward the hammock loop.

Additional retaining means which ensure that the inserted retaining loop cannot inadvertently move out of this suspension device are provided on the suspension device in the region of the receptacle for the loop. On the one hand, pimples or noses across which the loop end has to be moved in order to be inserted into the hook are provided here in the guide region of this hook. Said pimples or noses counteract inadvertent slipping out of the hook.

Furthermore, lateral noses which, in the case of a loop being under tension, fix said loop in its position may be provided so as to be transverse to the profile of the duct which forms the hook.

In the following, the invention is described in more detail by means of drawings, in which.

Figure 1:
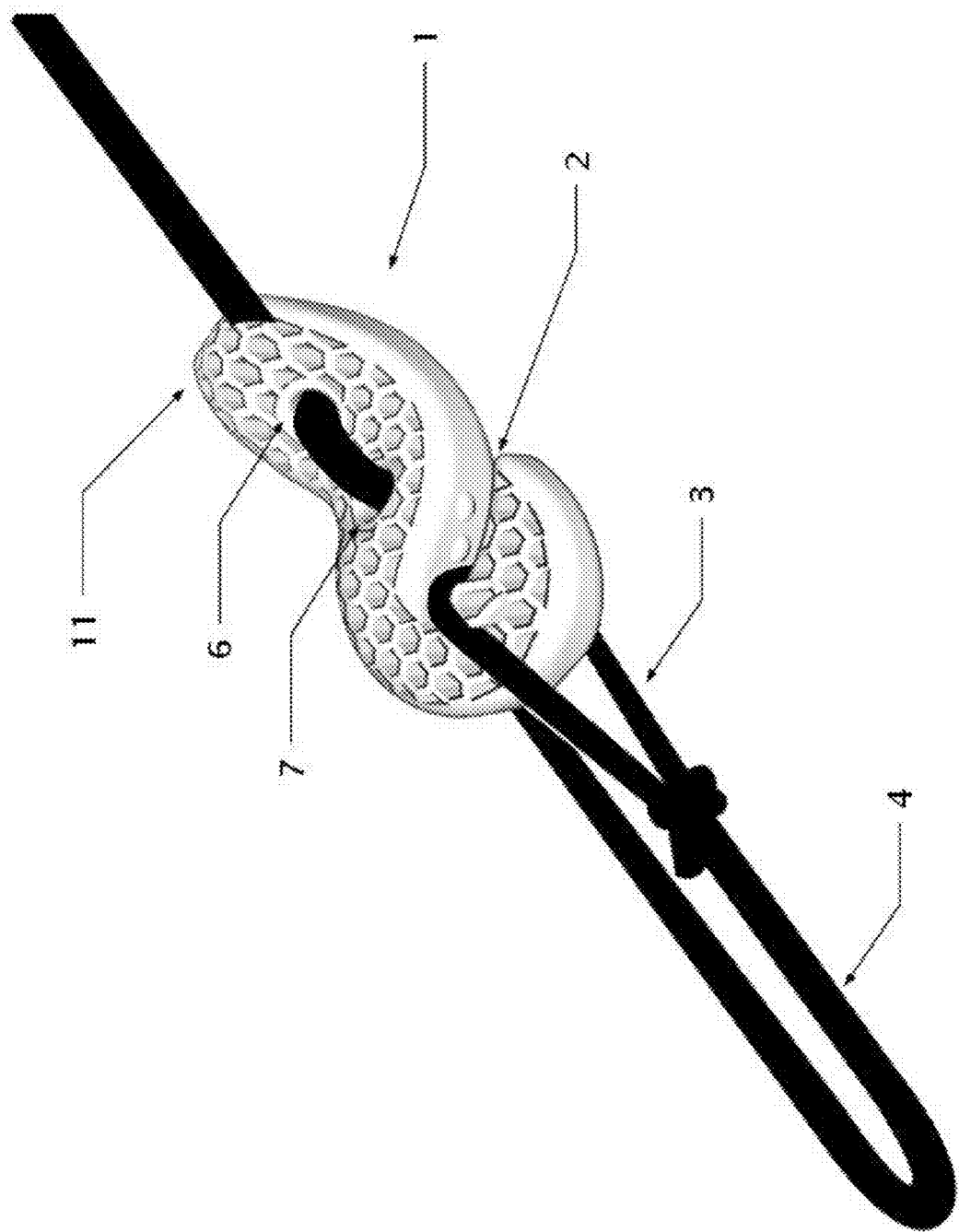
FIG. 1 shows the hammock suspension device with a suspension rope in the inserted state guided therein.
Figure 5:
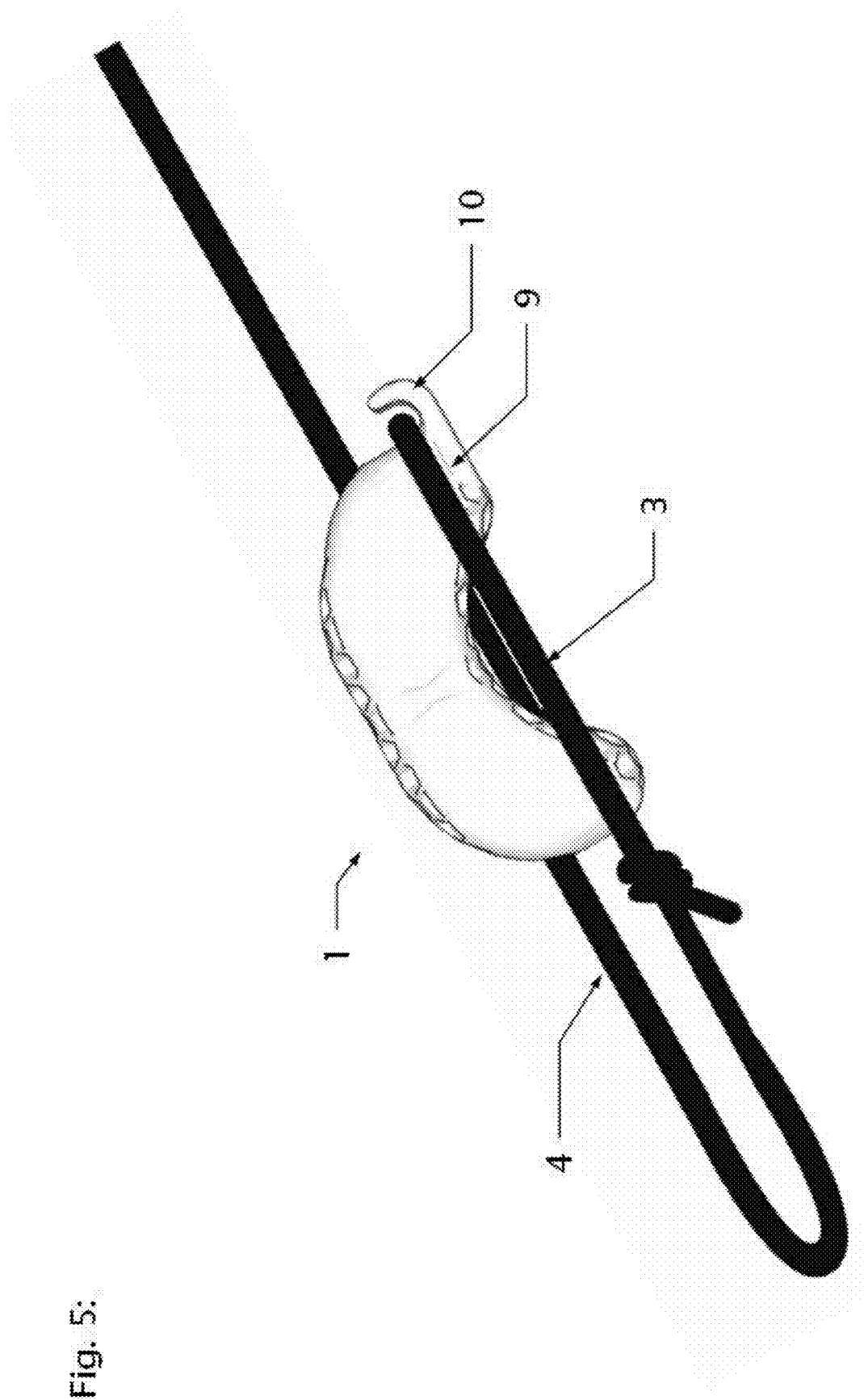
FIG. 5 shows the alternative construction concept having a loop of the guy rope, which loop is disposed so as to be over the suspension device.

FIGS. 1 and 5 elucidate the various possibilities relating to inserting the loop which is disposed at the rope end on the suspension device. FIG. 1 shows a solution in which a hook-like receptacle 2 into which the loop end 3 of a guy rope 4 is inserted is provided on the lower end of the suspension device 1.

Figure 3:
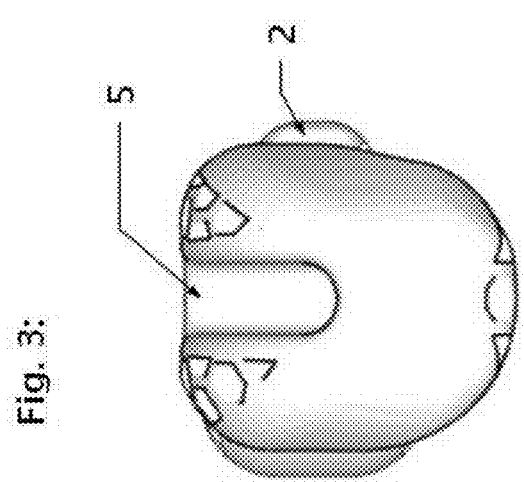
FIG. 3 shows a plan view onto the hammock suspension device, looking into the upper guide duct.

The guy rope 4 has previously been guided through the hammock suspension device 1. Here, the guy rope has been first introduced into an upper aperture 6 which opens into a guide duct 5. This guide duct 5 is identifiable in FIGS. 2 and 3, wherein said guide duct has an almost triangular base area and enables pivoting the rope within the guide duct from an approximately vertical position into an approximately horizontal position.

After exiting from the lateral aperture 6, the guy rope is guided in a curve along the side of the suspension device 1 and again guided by way of a second aperture 7 which lies therebelow through the hammock suspension device. In contrast to the upper aperture 6, this second lower aperture 7 is not widened but is a continuous boring which is vertically disposed in relation to the longitudinal extent of the hammock suspension, on account of which, in the case of a tensile load on the rope arrangement, the guy rope here is greatly unwound and, therefore, jamming arises.

Figure 2:
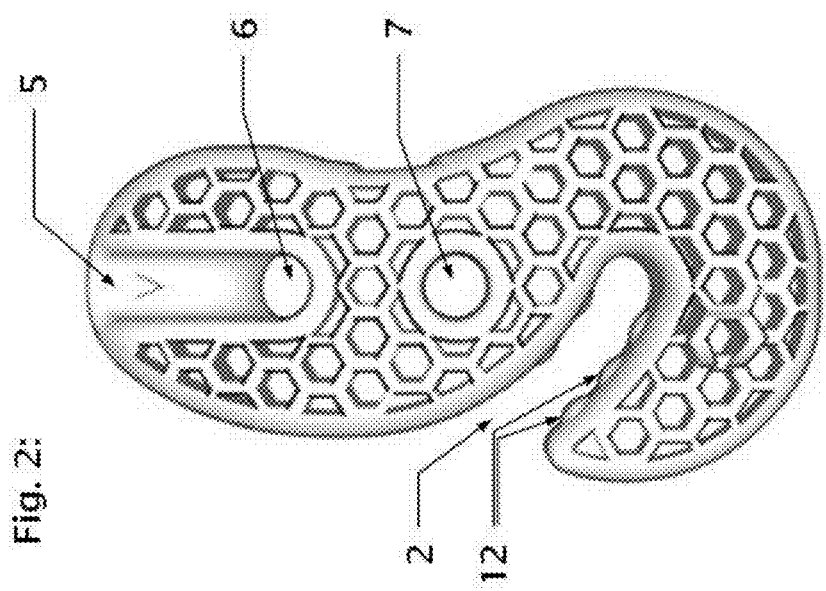
FIG. 2 shows the hammock suspension device in a side view, looking onto the guide duct of the upper aperture.

It is moreover identifiable in FIG. 2 that retaining protrusions 12, which are intended to counteract any inadvertent slipping out of the rope loop 3 from the receptacle 2, are provided in this hook receptacle 2. This is additionally supported by lateral protrusions 8 which are identifiable in FIG. 4. The inserted loop end 3 here comes to lie behind these protrusions 8, in the deepest point of the duct of the hook receptacle 2, on account of which said protrusions 8 prevent the guy rope 4 in the tensioned state from slipping down.

Figure 4:
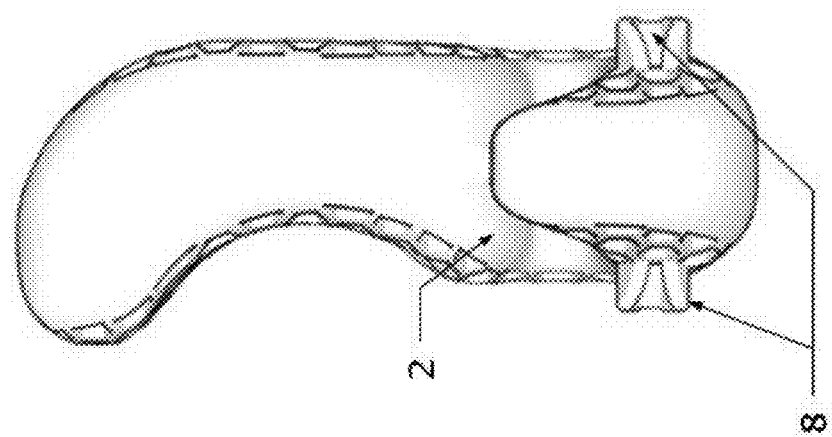
FIG. 4 shows the hammock suspension device in a side view, looking into the guide duct of the hook receptacle.

Moreover, FIG. 4 shows the ergonomic shaping of the suspension body, which has been specially adapted for easy manageability. This ergonomic shaping here is based on the shape of the human hand and has the effect that the suspension body can be easily gripped, angled and thus moved on the rope.

In FIG. 5, the alternative suspension of the loop end directly on the body of the hammock suspension device is identifiable. The rope guide pattern here runs through the hammock suspension device, as described above, and is guided through the hammock suspension. After insertion of the hammock into the lower loop that has been formed, the loop end is placed over the hammock suspension device, wherein it must be noted that the loop which is disposed by way of a knot on the free rope end is correspondingly dimensioned.

The loop is thus placed over the complete suspension device, wherein guide grooves 9 which run approximately vertically are disposed on the suspension device, in which guide grooves 9 the rope loop is retained so as not to be able to slip from the suspension device. The loop is additionally retained by a retaining nose 10 which is disposed at least on the upper side.

The invention claimed is:

1. A hammock suspension device for guiding a guy rope, comprising:
    a base body including
        upper and lower apertures;
        a receptacle configured to receive a retaining loop formed by the guy rope; and the upper and lower apertures being arranged in a longitudinal direction of the hammock suspension device; and
        a guide duct extending from the upper aperture to a peripheral edge of the base body and configured to introduce the guy rope into the hammock suspension device, wherein
    the upper aperture is configured to be oriented toward a fastening point of the guy rope and to connect the guide duct to enable a deflection of the guy rope at the guide duct, from approximately the longitudinal direction of the hammock suspension device to approximately a transverse direction of said hammock suspension device.

2. The hammock suspension device as claimed in claim 1, wherein the receptacle defines a hook on a lower end of the hammock suspension device.

3. The hammock suspension device as claimed in claim 1, wherein the hammock suspension device, as a bearing body, forms the receptacle configured to receive a loop end of the guy rope, and
    wherein the base body further includes a retaining member disposed on an upper side of the hammock suspension device and configured to cause a secure bearing of the loop end of the guy rope.

4. The hammock suspension device as claimed in claim 3, wherein the retaining member includes a retaining nose at least on the upper side on the hammock suspension device and configured to be releasable securing the loop end of the guy rope to the hammock suspension device.

5. The hammock suspension device as claimed in claim 4, wherein the retaining member further includes guide grooves which run a first direction perpendicular to the longitudinal and transverse directions of the hammock suspension device and are disposed at least laterally on the base body to be releasable securing the loop end of the guy rope to the hammock suspension device.

6. The hammock suspension device as claimed in claim 3, wherein the retaining member includes guide grooves which run in a first direction perpendicular to the longitudinal and transverse directions of the hammock suspension device and are disposed at least laterally on the base body to be releasable securing the loop end of the guy rope to the hammock suspension device.

7. The hammock suspension device as claimed in claim 1, wherein the base body further includes retaining means for releasable securing of the rope loop to the hammock suspension device.

8. The hammock suspension device as claimed in claim 1, wherein the base body further includes retaining protrusions formed in the receptacle and protruding outwardly from the peripheral edge of the base body.

9. The hammock suspension device as claimed in claim 1, wherein the base body further includes protrusions protruding outwardly in a first direction perpendicular to the longitudinal and transverse directions of the hammock suspension device.

10. The hammock suspension device as claimed in claim 1, wherein
    the lower aperture extends from a top surface of the base body to a bottom surface of the base body in a first direction perpendicular to the longitudinal and transverse directions of the hammock suspension device, and
    the upper aperture extends from the top surface to the bottom surface of the case body in a second direction inclined from the first direction.

* * * * *